(12) United States Patent
Gribok

(10) Patent No.: US 10,223,488 B2
(45) Date of Patent: Mar. 5, 2019

(54) METHOD AND APPARATUS FOR IMPROVING SYSTEM OPERATION BY REPLACING COMPONENTS FOR PERFORMING DIVISION DURING DESIGN COMPILATION

(71) Applicant: Altera Corporation, San Jose, CA (US)

(72) Inventor: Sergey Gribok, Santa Clara, CA (US)

(73) Assignee: Altera Corporation, San Jose, CA (US)

( * ) Notice: Subject to any disclaimer, the term of this patent is extended or adjusted under 35 U.S.C. 154(b) by 145 days.

(21) Appl. No.: 15/214,354

(22) Filed: Jul. 19, 2016

(65) Prior Publication Data

US 2018/0025100 A1  Jan. 25, 2018

(51) Int. Cl.
| | | |
|---|---|---|
| *G06F 17/50* | (2006.01) | |
| *G06F 7/52* | (2006.01) | |
| *G06F 7/535* | (2006.01) | |
| *G06F 8/41* | (2018.01) | |

(52) U.S. Cl.
CPC .............. *G06F 17/505* (2013.01); *G06F 7/52* (2013.01); *G06F 7/535* (2013.01); *G06F 17/5054* (2013.01); *G06F 8/443* (2013.01); *G06F 2207/5356* (2013.01); *G06F 2217/84* (2013.01)

(58) Field of Classification Search
CPC .... G06F 17/16; G06F 17/5054; G06F 17/505; G06F 7/483; G06F 7/49947; G06F 7/52

USPC ........................................................ 716/103
See application file for complete search history.

(56) References Cited

U.S. PATENT DOCUMENTS

| | | | | |
|---|---|---|---|---|
| 8,732,639 | B1 | 5/2014 | Fung et al. | |
| 8,959,469 | B2 * | 2/2015 | Chen ................... | G06F 17/5054 716/101 |
| 2006/0095494 | A1 * | 5/2006 | Kumar ..................... | G06F 7/535 708/502 |
| 2014/0280410 | A1 * | 9/2014 | Rose ................... | G06F 7/49947 708/209 |

OTHER PUBLICATIONS

Extended European Search Report for Patent Application No. 17176667.8, dated Dec. 13, 2017, 12, pages.
Ridiculousfish, "Labor of Division" (Episode 1), Feb. 15, 2010 (Feb. 15, 2010) Retrieved from the Internet: URL: http://ridiculousfish.com/blog/posts/labor-of-division-episode-i.html.
Torbjorn Granlund et al: "Division by invariant integers using multiplication" ACM SIGPLAN Notices, ACM, 2 Penn Plaza, Suite 701 New York, NY 10121-0701 USA, vol. 29, No. 6, Jun. 1, 1994 (Jun. 1, 1994) pp. 61-72.
European First Office Action for Patent Application No. 1717667.8, dated Dec. 14, 2018, 8 pages.

* cited by examiner

*Primary Examiner* — Nghia M Doan
(74) *Attorney, Agent, or Firm* — Compass IP Law PC

(57) ABSTRACT

A method for designing a system on a target device includes identifying components in a netlist that perform a division operation. The netlist is modified during synthesis to utilize other components to compute a result of the division operation by performing a multiplication operation.

19 Claims, 9 Drawing Sheets

METHOD AND APPARATUS FOR IMPROVING SYSTEM OPERATION BY REPLACING COMPONENTS FOR PERFORMING DIVISION DURING DESIGN COMPILATION

FIELD

Embodiments of the present disclosure relate to tools for designing systems on target devices. More specifically, embodiments of the present disclosure relate to a method and apparatus for improving system operation by replacing components for performing division during design compilation.

BACKGROUND

Target devices such as field programmable gate arrays (FPGAs), application specific integrated circuits (ASICs), and structured ASICs are used to implement large systems that may include million of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow is hardware description language (HDL) compilation. HDL compilation involves performing synthesis, placement, routing, and timing analysis of the system on the target device.

Division is a commonly used arithmetic operation. Among the commonly used classes of division algorithms are those that perform sequential division and those that perform fully parallel division. Sequential division requires multiple clock cycles where every clock cycle calculates just a few of the bits of the quotient. Fully parallel division requires a single clock cycle where every clock cycle computes a quotient, from a dividend and a divisor.

In order to perform fully parallel division using a reasonably desired clock frequency, designers are required to implement heavily pipeline the circuitry used for the division operation by adding many pipeline stages. The pipelining allows the circuitry to operate at a higher frequency, but increases propagation delay and the amount of logic required.

SUMMARY

Embodiments of the present disclosure recognize division by a constant in a netlist after register timing level (RTL) elaboration during synthesis. The division is transformed to multiplication by a reciprocal of the constant. A reciprocal precision, determined by a number of bits to represent a value of the reciprocal, is identified to ensure an acceptable result of the division while using a minimum amount of hardware. The multiplication is mapped into resources on a target device.

A method for designing a system on a target device includes identifying components in a netlist of the system that perform a division operation. The netlist of the system is modified during synthesis to utilize other components to compute a result of the division operation by performing a multiplication operation. According to an embodiment of the present disclosure, the division operation utilizes a divisor that is a constant. According to an embodiment of the present disclosure, a multiplier value for the multiplication operation is identified, and a number of bits to represent the multiplier value is identified. According to an embodiment of the present disclosure, the multiplier value is a reciprocal of the divisor. According to an embodiment of the present disclosure, a user is presented with options of performing the division operation with the components and performing the division operation with the other components, and the modifying is performed in response to the user selecting the other components.

BRIEF DESCRIPTION OF THE DRAWINGS

The features and advantages of embodiments of the present disclosure are illustrated by way of example and are not intended to limit the scope of the embodiments of the present disclosure to the particular embodiments shown.

DETAILED DESCRIPTION

In the following description, for purposes of explanation, specific nomenclature is set forth to provide a thorough understanding of embodiments of the present disclosure. It will be apparent to one skilled in the art that specific details in the description may not be required to practice the embodiments of the present disclosure. In other instances, well-known circuits, devices, procedures, and programs are shown in block diagram form to avoid obscuring embodiments of the present disclosure unnecessarily.

Figure 1:
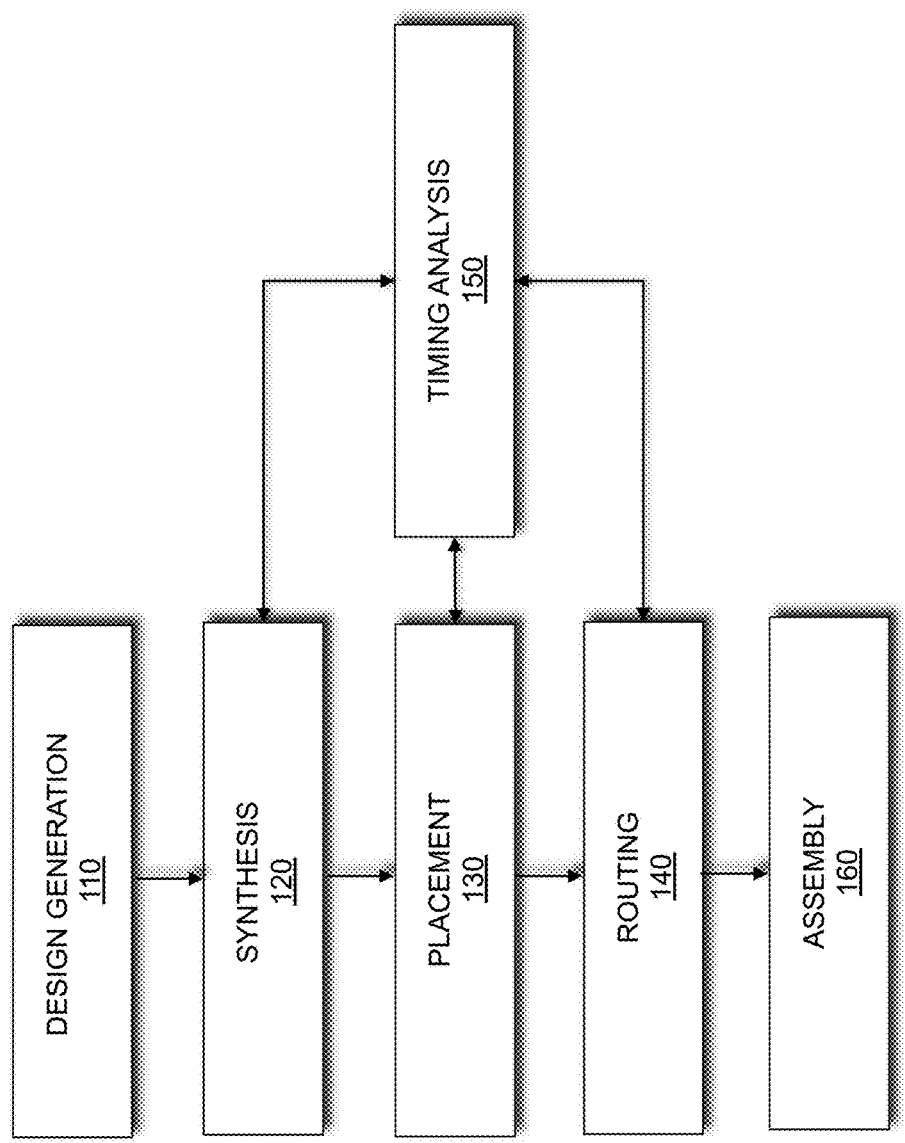
FIG. 1 is a flow chart illustrating a method for designing a system on a target device according to an exemplary embodiment of the present disclosure.

FIG. 1 is a flow chart illustrating a method for designing a system on a target device according to an exemplary embodiment of the present disclosure. The procedures described in FIG. 1 may collectively be referred to as "compilation" of a design. The target device may be a field programmable gate array (FPGA), application specific integrated circuit (ASIC), a structured ASIC, or other device whose functionality is described by a hardware description language (HDL). At 110, a design for the system is generated. According to an embodiment of the present disclosure, the design is generated in response to input provided by a user. In this embodiment, the user may input a register-transfer-level (RTL) description of the system, select and connect logic from a design library, or utilize other design input options. The design for the system generated may be in HDL and may include a plurality of reconfigurable logic blocks.

At 120, the system is synthesized and a netlist is generated. Synthesis includes generating a logic design of the system to be implemented by the target device. According to an embodiment of the present disclosure, synthesis generates an optimized logical representation of the system from an HDL design definition. During synthesis, an optimization procedure where identification and replacement may be performed where a network is identified from a netlist and replaced with a preferred network that is equivalent, but has a preferred configuration. A network may be preferred for a variety of different reasons. According to an embodiment of the present disclosure, a network may be preferred if it may be implemented with fewer components on the target device or fewer levels of logic, may be implemented with fewer wires on the target device, may require less power to operate, and/or may operate at higher speed or frequency (Fmax) than the original network in the design. According to an embodiment of the present disclosure, network replacement may include replacing a division module or node in the netlist with a multiplication module or node.

At 130, the system is placed. According to an embodiment of the present disclosure, placement involves placing the mapped logical system design on the target device. Placement works on the technology-mapped netlist to produce a placement for each of the logic elements and functional blocks. According to an embodiment of the present disclosure, placement includes fitting the system on the target device by determining which resources on the target device are to be used to implement the logic elements and functional blocks identified during synthesis. Placement may include clustering which involves grouping logic elements together to form the logic clusters present on the target device. According to an embodiment of the present disclosure, clustering is performed at an early stage of placement and occurs after synthesis during the placement preparation stage. Placement may also minimize the distance between interconnected resources to meet timing constraints of the timing netlist.

At 140, the placed design is routed. During routing, routing resources on the target device are allocated to provide interconnections between logic gates, logic elements, and other components on the target device. According to an embodiment of the present disclosure, routing aims to reduce the amount of wiring used to connect components in the placed logic design. Routability may include performing fanout splitting, logic duplication, logical rewiring, or other procedures. It should be appreciated that one or more of the procedures may be performed on the placed logic design. Timing optimization may also be performed during routing to allocate routing resources to meet the timing constraints of the timing netlist.

At 150, timing analysis is performed on the system designed. According to an embodiment of the present disclosure, the timing analysis determines whether timing constraints of the system are satisfied. As part of timing analysis, slack analysis may be performed. It should be appreciated that the timing analysis may be performed during and/or after each of the synthesis 120, placement 130, and routing procedures 140 to guide compiler optimizations.

At 160, an assembly procedure is performed. The assembly procedure involves creating a program file that includes information determined by the procedures described at 110, 120, 130, 140, and 150. The program file may be a bit stream that may be used to program a target device. In the case of an ASIC, the program file may represent the physical layout of the circuit. According to an embodiment of the present disclosure, the procedures illustrated in FIG. 1 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium. The target device may be programmed with the data file. By programming the target with the data file, components (programmable resources) on the target device are physically transformed to implement the system.

Figure 2:
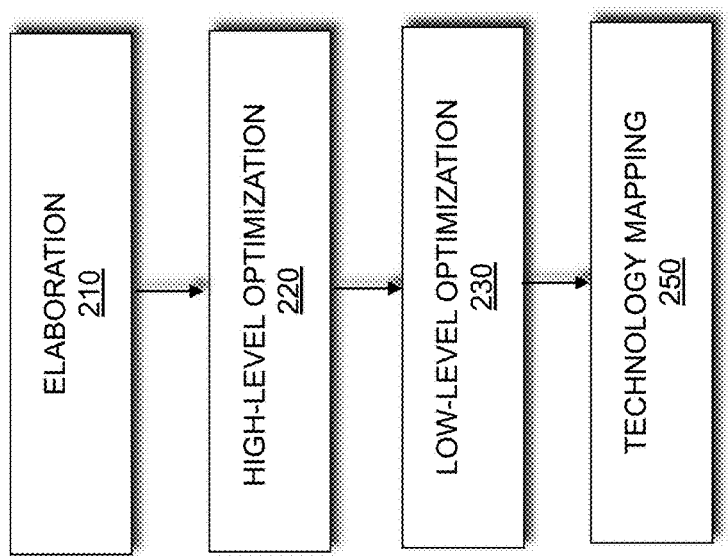
FIG. 2 is a flow chart illustrating a method for performing synthesis according to an exemplary embodiment of the present disclosure.

FIG. 2 is a flow chart illustrating a method for performing synthesis according to an exemplary embodiment of the present disclosure. According to an embodiment of the present disclosure, the method described in FIG. 2 may be used to implement procedure 120 shown on FIG. 1. At 210, elaboration is performed. During elaboration, a description of a system is received. The description of the system may be in a text format such as hardware description language (HDL), register timing level (RTL), or other format. The hardware structures in the description of the system is recognized and converted into generic technology cells. According to an embodiment of the present disclosure, the generic technology cells/components may include registers, adders, comparators, multiplexers, gates, and/or other components. A netlist is generated which includes a description of the generic technology cells/components in a design for the system.

At 220, high-level optimization is performed. According to an embodiment of the present disclosure, high-level optimization includes identification of a network and replacement of the network with a preferred network that generates an equivalent result, but has a preferred configuration. According to an embodiment of the present disclosure, a network that performs division with a constant is identified and is replaced with a network that performs multiplication and that generates an equivalent result. It should be appreciated that other network replacement procedures may be performed during high-level optimization. For example, multiplexers with data inputs driven by constants may be replaced with read only memory (ROM) nodes. Chains of sequentially connected registers may be replaced with shift-register nodes.

At 230, low-level optimization is performed. According to an embodiment of the present disclosure, the low-level optimization may include performing minimization where Boolean optimizations are performed on the netlist to reduce the logic required to implement the design. Low-level optimization may include performing decomposition, such as arithmetic or functional decomposition, where larger gates are broken down into more efficient smaller input gates.

At 240, technology mapping is performed. According to an embodiment of the present disclosure technology mapping is performed on an optimized logic design. Technology mapping includes determining how to implement logic gates and logic elements in the optimized logic representation with specific resources on the target device such as logic elements and functional blocks. According to an embodiment of the present disclosure, a logic netlist is generated from mapping during synthesis. This netlist may be an optimized technology-mapped netlist generated from the HDL. The logic netlist may identify resources utilized in a target and interconnections between ports of the resources.

Figure 3:
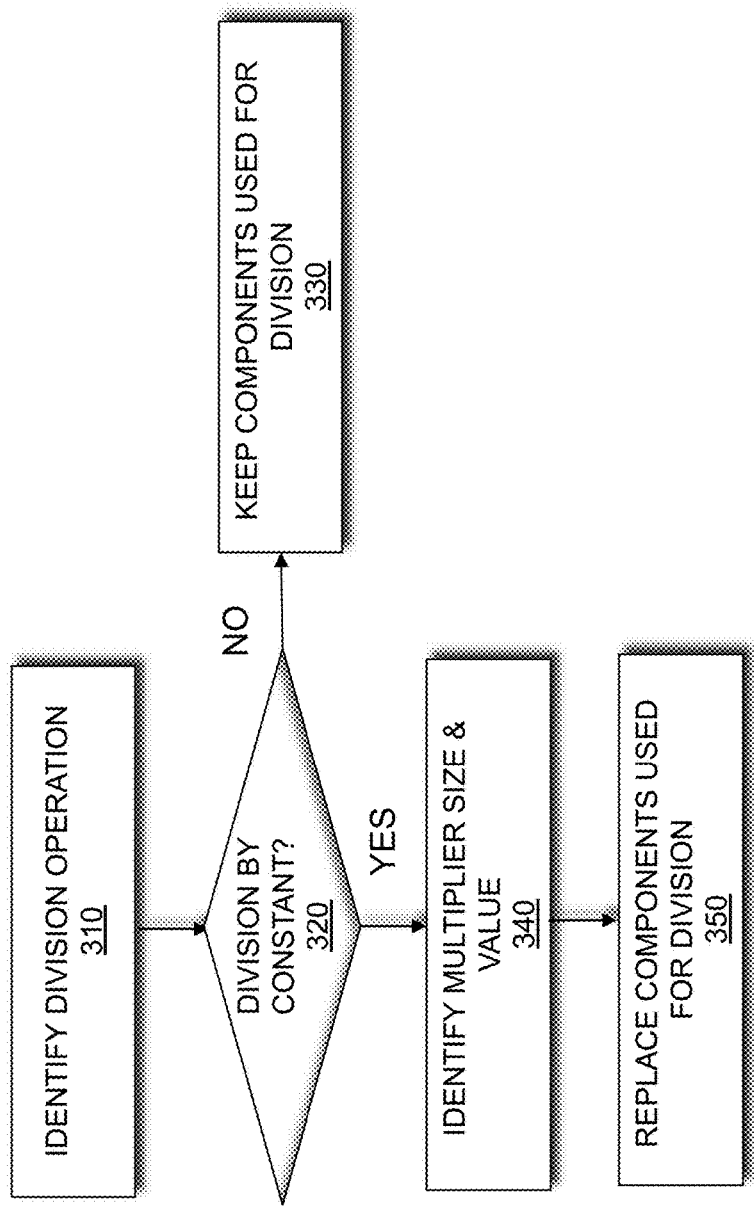
FIG. 3 is a flow chart illustrating a method for performing division replacement during synthesis according to an exemplary embodiment of the present disclosure.

FIG. 3 is a flow chart illustrating a method for performing division replacement during synthesis according to an exemplary embodiment of the present disclosure. According to an embodiment of the present disclosure, the method described in FIG. 3 may be used to implement procedure 220 shown on FIG. 2 where identification and replacement is used to identify and replace a network which performs division with a network which performs multiplication. At 310, a division operation is identified from a netlist for a design of a system. According to an embodiment of the present disclosure, the division operation may be identified by recognizing its attribute and/or node type on the netlist At 320, it is determined whether the division operation relates to performing division with a divisor that is a constant. If it is determined that the division operation does not pertain to performing division with a divisor that is a constant, control proceeds to 330. If it is determined that the division operation pertains to performing division with a divisor that is a constant, control proceeds to 340.

At 330, components used for performing the division operation identified are kept in the design and are not replaced.

At 340, a multiplier value and its degree of precision in terms of size (number of bits required to represent the multiplier value) are identified. The multiplier value is a reciprocal of the divisor. According to an embodiment of the present disclosure, the multiplier value, m, and a value, L, that may be used to identify a number of bits to shift an output value from the multiplication operation may be identified using the following relationships. According to an embodiment of the present disclosure, a division by d is replaced with a multiplication operation followed by a shift by a value N+L, where L is an extra number of bits that are shifted. As a result, N+L least significant bits of a result may be discarded.

Given a division operation with a divisor, d, and number of bits required to represent the dividend, N, suppose m and L are non-negative integers such that relationships (1) and (2) are true.

$$d \neq 0 \quad (1)$$

$$2^{N+L} \leq m*d \leq 2^{N+L}+2^L \quad (2)$$

Relationships (1) and (2) may be used to identify values for m and L.

At 350, components used for the division operation are replaced. According to an embodiment of the present disclosure, the components used for the division operation are replaced with other components that generate a result equivalent to a result of the division operation. The other components perform a multiplication operation using the multiplier value.

According to an embodiment of the present disclosure, after procedure 340, a user may be presented with an option of performing the division operation using the components and performing traditional division by a constant, and an option of performing a multiplication operation using the other components to generate an equivalent result. The option provided to the user may include the identity of the components and other components, and/or the requirements and benefits of each option. This may include, for example, the maximum frequency of operation of the system associated with each option. In response to user input, control may replace the components used for division (as shown at procedure 350) or keep the components used for division (as shown at procedure 330).

It should be appreciated that the procedure illustrated in FIG. 3 may be used to identify and replace networks associated with a plurality of division operations. For example, the procedures illustrated in FIG. 3 may be executed to identify and replace a plurality of networks in parallel. The procedures illustrated in FIG. 3 may also be repeated to identify and replace the plurality of networks in a sequential fashion.

Division operations are one of the most common arithmetic operations used in digital signal processing. Hardware implementations of division operations generally yield slow results. Embodiments of the present disclosure recognize a special case of division operations, division by a constant, where hardware implementations may be generated which yield fast results. Division by a constant may be used when performing radix conversions, array index by address calculations, trip count computations, hash-table index calculations, and other computations. According to an embodiment of the present disclosure, division by a constant is recognized in a netlist during synthesis. The division operation and hardware associated with the division operation is converted into a multiplication operation with a reciprocal of the constant and hardware associated with the multiplication operation to yield faster operation.

Figure 4:
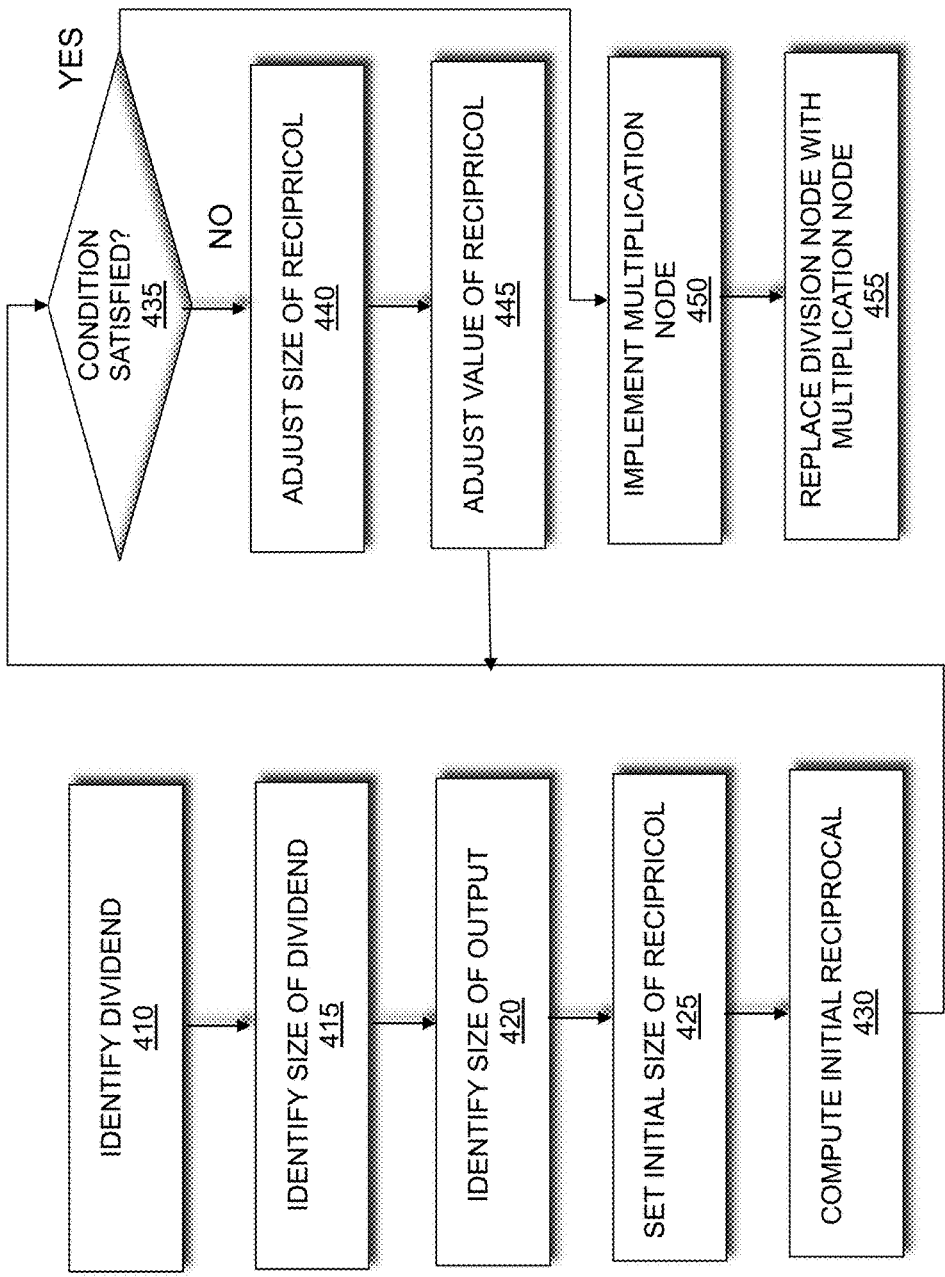
FIG. 4 is a flow chart illustrating a method for identifying a multiplier size and value for division replacement according to an exemplary embodiment of the present disclosure.

FIG. 4 is a flow chart illustrating a method for identifying a multiplier size and multiplier value for division replacement according to an exemplary embodiment of the present disclosure. According to an embodiment of the present disclosure, the method described in FIG. 4 may be used to implement procedures 340 and 350 shown on FIG. 3. At 410, a dividend for a division operation is identified. The dividend may be referred to as d.

At 415, a size of the dividend for the division operation is identified. The size of the dividend reflects an amount of precision required for representing a value of the dividend. According to an embodiment of the present disclosure, the size of the dividend may be measured in terms of a number of bits. The size of the dividend may be referred to as N.

At 420, a size of a result of the division operation is identified. The size of the result reflects an amount of precision required for representing a value of the result. According to an embodiment of the present disclosure, the size of the result may be measured in terms of a number of bits. The size of the result may be referred to as S.

At 425, an initial size of a reciprocal which operates as the multiplier is initialized. The size of the multiplier reflects an amount of precision required for representing a value of the multiplier. According to an embodiment of the present disclosure, the size of the multiplier may be measured in terms of a number of bits. The size of the multiplier may be referred to as L and be initially set to zero.

At 430, an initial value of the reciprocal is computed. The value for the reciprocal is used as a multiplier to compute a result that is equivalent to a result from the division operation. The reciprocal may be referred to as m. According to an embodiment of the present disclosure, the initial value of the reciprocal may be computed with the following relationship.

$$m = \mathrm{ceil}(2^N/d) \quad (4)$$

At 435, it is determined whether the current value of the reciprocal satisfies a condition. According to an embodiment of the present disclosure, the condition tests whether the value m is sufficient to approximate L/d. If the current value of the reciprocal does not satisfy the condition, control proceeds to 440. If the current value of the reciprocal satisfies the condition, control proceeds to 450. According to an embodiment of the present disclosure, the condition tested is reflected by the following relationship.

$$m*d-2^{N+L}<=2^L \quad (5)$$

At 440, the size of the reciprocal is adjusted. According to an embodiment of the present disclosure, the size of the reciprocal is adjusted by incrementing it by a value of one bit.

At 445, the value of the reciprocal is adjusted. After adjusting the value of the reciprocal, control returns to 435 to determine whether the adjusted value of the reciprocal satisfies the condition. According to an embodiment of the present disclosure, the size of the reciprocal is adjusted by using the following relationship.

$$m=\text{ceil}(2^{N+L}/d) \quad (5)$$

At 450, a multiplication node is implemented. According to an embodiment of the present disclosure, components for performing a multiplication operation that generates a result that is equivalent to the result of the division operation are identified. The components in the multiplication node require fewer resources and fewer levels of logic in a target device than components in a division node that performs the division operation.

At 455, the division node is replaced with the multiplication node. According to an embodiment of the present disclosure, the components of the division node are replaced with components of the multiplication in a description of the system. Input and output connections corresponding to the division node are updated and input and output connections to the multiplication node are specified.

According to an embodiment of the present disclosure. The pseudo code listed below may be used to implement the procedure described in FIG. 4.

```
for each unsigned division operator DIV {
    if (has_constant_driver (DIV.B)) {
        integer d = get_constant_driver (DIV.B);
        integer N = get_size (DIV.A);
        integer S = get_size (DIV.Z);
        integer L = 0;
        integer m = ceil (2^N/d);
        while (m*d - 2^{N+L}>2^L) {
            L += 1;
            m = ceil(2^{N+L}/d);
        }
        Mult_operator MULT (N, get_size(m));
        connect (MULT.A, DIV.A);
        connect (MULT.B, m);
        connect (MULT.Z [S+N+L-1:N+L-1], DIV.Z;
        remove (DIV);
    }
}
```

FIGS. 1-4 are flow charts that illustrate embodiments of the present disclosure. The procedures described in these figures may be performed by an EDA tool implemented by a computer system. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 5A:
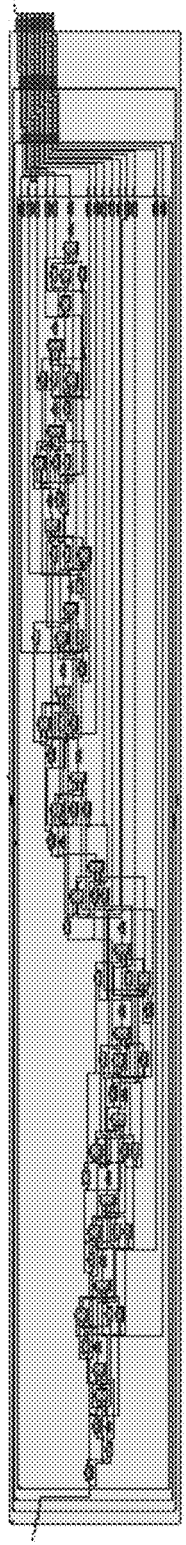
FIG. 5A illustrates an example of hardware on a target device implemented to generate a division result prior to performing division replacement according to an exemplary embodiment of the present disclosure.
Figure 5B:
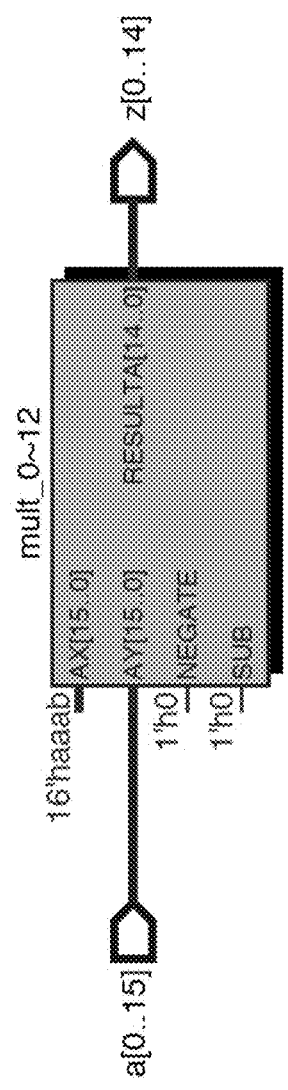
FIG. 5B illustrates an example of hardware on a target device implemented to generate a division result after performing division replacement according to an exemplary embodiment of the present disclosure.

FIG. 5A illustrates an example of hardware on a target device implemented to generate a division result by performing a division operation prior to performing division replacement according to an exemplary embodiment of the present disclosure. FIG. 5B illustrates an example of hardware on a target device implemented to generate a division result by performing a multiplication operation after performing division replacement according to an exemplary embodiment of the present disclosure. As illustrated, the amount of hardware resources required for generating a division result by performing a multiplication operation is significantly less than the amount of hardware resources required for generating the division result by performing a division operation. According to an embodiment of the present disclosure, the hardware that is used to perform the multiplication operation in FIG. 5B is a digital signal processor block.

Figure 6:
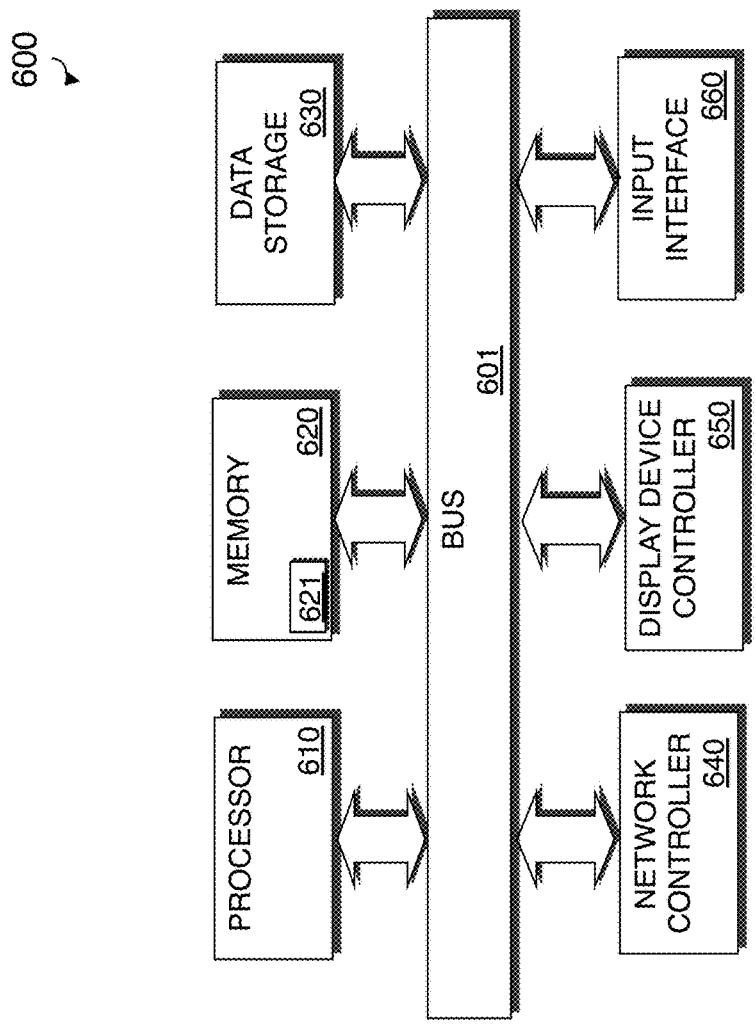
FIG. 6 is a block diagram of a computer system implementing a system designer according to an exemplary embodiment of the present disclosure.

FIG. 6 is a block diagram of an exemplary computer system 600 in which an example embodiment of the present disclosure resides. The computer system 600 includes a processor 610 that process data signals. The processor 610 is coupled to a bus 601 or other switch fabric that transmits data signals between processor 610 and other components in the computer system 600. The computer system 600 includes a memory 620. The memory 620 may store instructions and code represented by data signals that may be executed by the processor 610. A data storage device 630 is also coupled to the bus 601.

A network controller 640 is coupled to the bus 601. The network controller 640 may link the computer system 600 to a network of computers (not shown) and supports communication among the machines. A display device controller 650 is coupled to the bus 601. The display device controller 650 allows coupling of a display device (not shown) to the computer system 600 and acts as an interface between the display device and the computer system 600. An input interface 660 is coupled to the bus 601. The input interface 660 allows coupling of an input device (not shown) to the computer system 600 and transmits data signals from the input device to the computer system 600.

A system designer 621 may reside in the memory 620 and be executed by the processor 610. The system designer 621 may operate to perform synthesis, placement, routing, and timing analysis on a design for a system. According to an embodiment of the present disclosure, components that perform a division operation are identified from a description of the system. The description of the system is modified during synthesis to utilize other components to compute a result of the division operation by performing a multiplication operation. According to an embodiment of the disclosure, a multiplier value, which is a reciprocal of a divisor of the division operation, is identified. A number of bits to represent the multiplier value is also identified in response to a size of the divisor, a value of the divisor, and a size of a result of the division operation.

Figure 7:
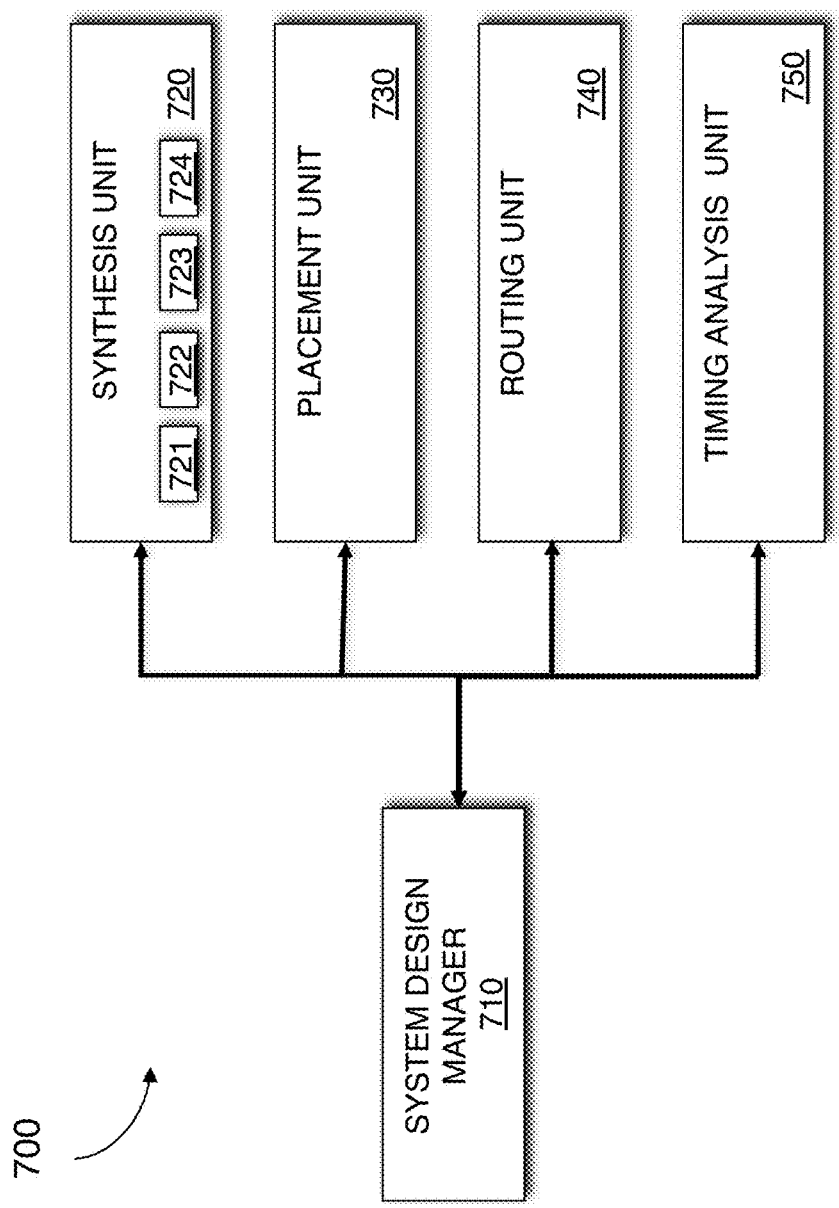
FIG. 7 is a block diagram of a system designer according to an exemplary embodiment of the present disclosure.

FIG. 7 illustrates a system designer 700 according to an embodiment of the present disclosure. The system designer 700 may be an EDA tool for designing a system on a target device such as an FPGA, structured application-specific integrated circuit (ASIC), ASIC, or other circuitry. FIG. 7 illustrates modules implementing an embodiment of the system designer 700. According to one embodiment, the modules represent software modules and system design may be performed by a computer system such as the one illustrated in FIG. 6 executing sequences of instructions represented by the modules shown in FIG. 7. Execution of the sequences of instructions causes the computer system to support system design as will be described hereafter. In alternate embodiments, hard-wire circuitry may be used in place of or in combination with software instructions to implement embodiments of present disclosure. Thus, embodiments of present disclosure are not limited to any specific combination of hardware circuitry and software. The system designer 700 includes a system designer manager 710. The system designer manager 710 is connected to and transmits data between the components of the system designer 700.

The system designer 700 includes a synthesis unit 720. The synthesis unit 720 takes a conceptual HDL design definition and generates an optimized logical representation of the system. The optimized logical representation of the system generated by the synthesis unit 720 may include a representation that has a reduced number of functional blocks and registers, such as logic gates and logic elements, required for the system. Alternatively, the optimized logical representation of the system generated by the synthesis unit 720 may include a representation that has a reduced depth of logic and that generates a lower signal propagation delay.

The synthesis unit 720 includes an elaboration unit 721. The elaboration unit 721 receives a description of a system. The description of the system may be in a text format such as hardware description language (HDL), register timing level (RTL), or other format. The elaboration unit 721 recognizes hardware structures in the description of the system and converts the hardware structures into generic technology cells. According to an embodiment of the present disclosure, the generic technology cells/components may include registers, adders, comparators, multiplexers, gates, and/or other components. The elaboration unit generates a netlist which includes a description of the generic technology cells/components in a design for the system.

The synthesis unit 720 includes a high-level optimization unit 722. According to an embodiment of the present disclosure, the high-level optimization unit 722 identifies a network and replaces the network with a preferred network that generates an equivalent result, but has a preferred configuration. In one embodiment, a network that performs division with a constant is identified and is replaced with a network that performs multiplication and that generates an equivalent result.

The synthesis unit 720 includes a low-level optimization unit 723. According to an embodiment of the present disclosure, the low-level optimization unit 723 performs minimization where Boolean optimizations are performed on the netlist to reduce the logic required to implement the design. The low-level optimization unit 723 may also perform decomposition, such as arithmetic or functional decomposition, where larger gates are broken down into more efficient smaller input gates.

The synthesis unit 720 includes a technology mapping unit 724. According to an embodiment of the present disclosure, the technology mapping unit 724 determines how to implement logic gates and logic elements in the optimized logic representation with specific resources on the target device such as logic elements and functional blocks. In one embodiment, the technology mapping unit 724 generates a logic netlist during synthesis. This netlist may be an optimized technology-mapped netlist generated from the HDL. The logic netlist may identify resources utilized in a target and interconnections between ports of the resources.

The system designer 700 includes a placement unit 730 that processes the optimized technology-mapped netlist to produce a placement for each of the functional blocks. The placement identifies which components or areas on the target device are to be used for specific functional blocks and registers.

The system designer 700 includes a routing unit 740 that determines the routing resources on the target device to use to provide interconnection between the components implementing functional blocks and registers of the logic design.

The system designer 700 includes a timing analysis unit 750 that performs timing analysis to determine whether timing constraints of the system are satisfied.

The system designer manager 710 may perform an assembly procedure that creates a data file that includes the design of the system. The data file may be a bit stream that may be used to program the target device. The assembly procedure may output the data file so that the data file may be stored or alternatively transmitted to a separate machine used to program the target device. It should be appreciated that the assembly procedure may also output the design of the system in other forms such as on a display device or other medium.

Figure 8:
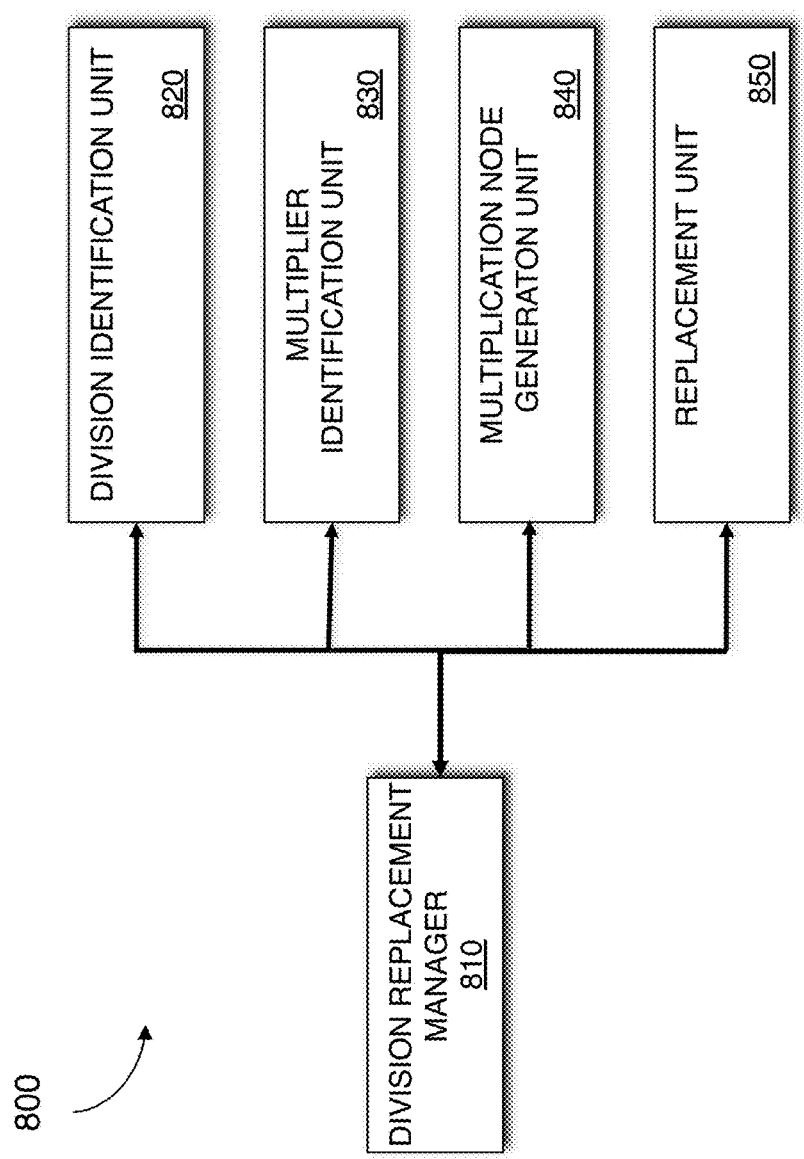
FIG. 8 is a block diagram of a division replacement unit according to an exemplary embodiment of the present disclosure.

FIG. 8 is a block diagram of a division replacement unit 800 according to an exemplary embodiment of the present disclosure. The division replacement unit 800 may be used to implement the high-level optimization unit 722 illustrated in FIG. 7. The division replacement unit 800 includes a division replacement manager 810. The division replacement manager 810 is connected to and transmits data between the components of the division replacement unit 800.

The division replacement unit 800 includes a division identification unit 820. The division identification unit 820 identifies a division operation from a netlist for a design of a system. According to an embodiment of the present disclosure, the division identification unit 820 identifies a division operation where the divisor is a constant.

The division replacement unit 800 includes a multiplier identification unit 830. The multiplier identification unit 830 identifies a multiplier value. The multiplier value is a reciprocal of the divisor and may be used for performing a multiplication operation that generates a result that is equivalent to a result of the division operation. The multiplier identification unit 830 also identifies a degree of precision of the multiplier value in terms of size to generate the equivalent result. The degree of precision may describe a number of bits required to represent the multiplier value. According to an embodiment of the present disclosure, the multiplier value and its degree of precision may be identified using the procedure described with reference to FIGS. 3 and 4.

The division replacement unit 800 includes a multiplication node generation unit 840. The multiplication node generation unit 840 identifies components for performing the multiplication operation that generates the result that is equivalent to the result of the division operation. The components in the multiplication node require fewer resources and fewer levels of logic in a target device than components in a division node that performs the division operation.

The division replacement unit 800 includes a replacement unit 850. The replacement unit 850 replaces components used for the division operation with other components used for the multiplication operation. The replacement unit 850 also updates input and output connections corresponding to the division node, and specifies input and output connections to the multiplication node.

According to an embodiment of the present disclosure, the division replacement manager 810 may present a user with an option of performing the division operation using the components to perform traditional division by a constant, and an option of performing a multiplication operation using the other components to generate an equivalent result. The options provided to the user may include the identity of the components and other components, and/or the requirements and benefits of each option. This may include, for example, the maximum frequency of operation of the system associated with each option. The replacement unit 850 may operate in response to input from the user.

It should be appreciated that embodiments of the present disclosure may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 9:
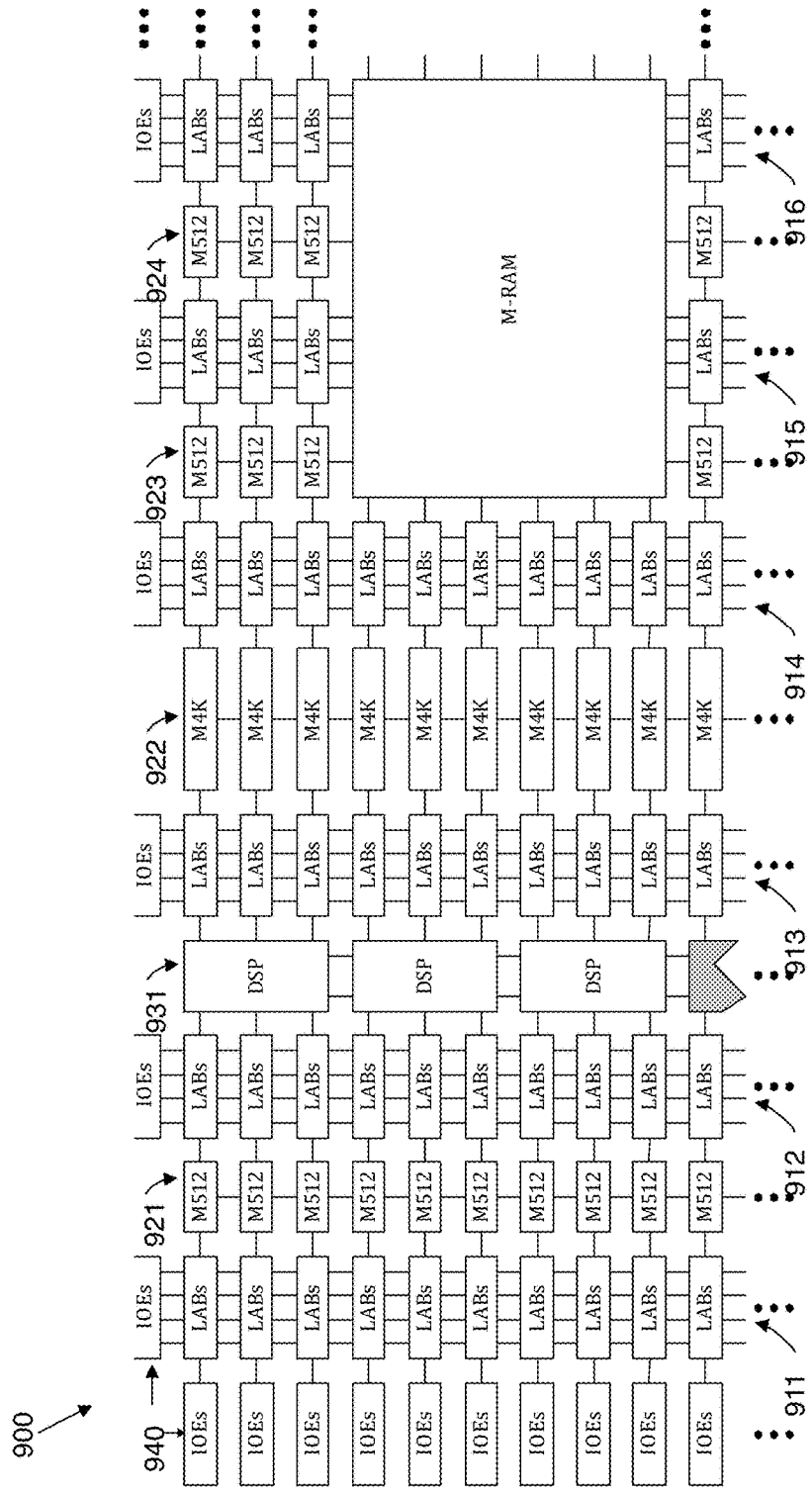
FIG. 9 illustrates an exemplary target device according to an exemplary embodiment of the present disclosure.

FIG. 9 illustrates a device 900 that may be used to implement a target device according to an embodiment of the present disclosure. The device may be implemented on a die, as discussed above. The device 900 is a field programmable gate array (FPGA) that includes a plurality of logic-array blocks (LABs). According to an embodiment of the present disclosure, the device 900 may be implemented on a single integrated circuit. Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present disclosure, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present disclosure, the logic block may operate similarly to an adaptive logic module (ALM), such as those found in Stratix devices manufactured by Altera Corporation. LABs are grouped into rows and columns across the device 900. Columns of LABs are shown as 911-916. It should be appreciated that the logic block may include additional or alternate components.

The device 900 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 900. Columns of memory blocks are shown as 921-924.

The device 900 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 900 and are shown as 931.

The device 900 includes a plurality of input/output elements (IOEs) 940. Each IOE feeds an IO pin (not shown) on the device 900. The IOEs 940 are located at the end of LAB rows and columns around the periphery of the device 900. Each IOE may include a bidirectional IO buffer and a plurality of registers for registering input, output, and output-enable signals.

The device 900 may include routing resources such as LAB local interconnect lines, row interconnect lines ("H-type wires"), and column interconnect lines ("V-type wires") (not shown) to route signals between components on the target device.

In the foregoing specification, embodiments of the disclosure have been described with reference to specific exemplary embodiments thereof. It will, however, be evident that various modifications and changes may be made thereto without departing from the broader spirit and scope of the embodiments of the disclosure. The specification and drawings are, accordingly, to be regarded in an illustrative rather than restrictive sense.

What is claimed is:

1. A method for designing a system on a target device, comprising:
    identifying components in the system that perform a division operation from a netlist of the system;
    modifying the netlist of the system during synthesis to utilize components other than the identified components to compute a result of the division operation by performing a multiplication operation without any other subsequent arithmetic operation;
    placing and routing the system as reflected in the modified netlist;
    generating a data file that includes a design of the system that is synthesized, placed, and routed; and
    programming the target device with the data file to physically transform programmable resources on the target device to implement the design of the system, wherein the target device has been implemented on a die.

2. The method of claim 1, wherein the division operation comprises a division operation where a divisor is a constant.

3. The method of claim 1 further comprising:
    identifying a multiplier value for the multiplication operation; and
    identifying bits to use from an output of the multiplication operation to represent the result.

4. The method of claim 3, wherein the multiplier value is a reciprocal of a divisor.

5. The method of claim 3, wherein identifying the multiplier value comprises:
    initializing the multiplier value to a value equal to a ceiling of $2^N/d$, wherein N is a size of a dividend, and d is a divisor; and
    adjusting the multiplier value to a value equal to a ceiling of $2^{N+L}/d$, wherein L is initialized at zero and is incremented until $m*d-2^{N+L}$ is less than or equal to $2^L$.

6. The method of claim 5, wherein bits to use from an output of the multiplication operation to represent the result is identified from L.

7. The method of claim 1, wherein the components other than the identified components require fewer resources on the target device than the components, and allow the system to operate at a higher maximum frequency than the components.

8. The method of claim 1 further comprising presenting a user options of performing the division operation with the identified components and performing the division operation with the components other than the identified components, wherein the modifying is performed in response to the user selecting the other components.

9. The method of claim 1 further comprising performing technology mapping wherein component types available on the target device are identified to implement the components other than the identified components.

10. The method of claim 9, wherein the component types are digital signal processors.

11. A non-transitory computer readable medium including a sequence of instructions stored thereon for causing a computer to execute a method for designing a system on a target device, comprising:
    identifying a first plurality of components in a system that perform a division operation from a netlist of the system;
    identifying a second plurality of components other than the first plurality of components to use for computing a result of the division operation by performing a multiplication operation;
    presenting a user with an identity of the first plurality of components and the second plurality of components, and an option of utilizing the first plurality of components or the second plurality of components other components for the system;
    modifying the netlist of the system during synthesis to utilize the second plurality of components in place of the first plurality of components in response to input from the user;
    placing and routing the system as reflected in the modified netlist;
    generating a data file that includes a design of the system that is synthesized, placed, and routed; and
    programming the target device with the data file to physically transform programmable resources on the target device to implement the design of the system, wherein the target device has been implemented on a die.

12. The non-transitory computer readable medium of claim 11, wherein identifying the second plurality of components comprises:
    identifying a multiplier value for performing the multiplication operation; and
    identifying a bits to use from an output of the multiplication operation to represent the result.

13. The non-transitory computer readable medium of claim 12, wherein identifying the multiplier value comprises:
    initializing the multiplier value to a value equal to a ceiling of $2^N/d$, wherein N is a size of a dividend, and d is a divisor; and
    adjusting the multiplier value to a value equal to a ceiling of $2^{N+L}/d$, wherein L is initialized at zero and is incremented until $m*d-2^{N+L}$ is less than or equal to $2^L$.

14. The non-transitory computer readable medium of claim 13, wherein bits to use from an output of the multiplication operation to represent the result is identified from L.

15. The non-transitory computer readable medium of claim 11 further comprising performing technology mapping wherein component types available on the target device are identified to implement the second plurality of components.

16. The non-transitory computer readable medium of claim 15, wherein the component types are digital signal processors.

17. A system designer, comprising:
    a synthesis unit that identifies components in a netlist of the system that perform a division operation, and that modifies the netlist of the system to utilize components other than the identified components to compute a result of the division operation by performing a multiplication operation without a subsequent arithmetic operation;
    a placement unit that places the system as reflected by the modified netlist on a target device;
    a routing unit that routes the system as reflected by the modified netlist on the target device; and
    an assembly unit that generates a data file that includes a design of the system that is synthesized, placed, and routed, and that programs the target device with the data file to physically transform programmable resources on the target device to implement the design of the system, wherein the target device has been implemented on a die.

18. The system designer of claim 17, wherein the synthesis unit comprises a multiplier identification unit that identifies a multiplier value for the multiplication operation, and a number of bits to represent the multiplier value.

19. The system designer of claim 18, wherein the multiplier identification unit identifies the multiplier value, m, based on whether $m*d-2^{N+L}$ is less than or equal to $2^L$, wherein N is a size of a dividend, d is a divisor, and L is used to identify bits from an output of the multiplication operation to represent the result.

* * * * *